(No Model.)
L. COTÉ.
Machine for Shaping Heel Stiffeners for Boots and Shoes.
No. 240,971. Patented May 3, 1881.
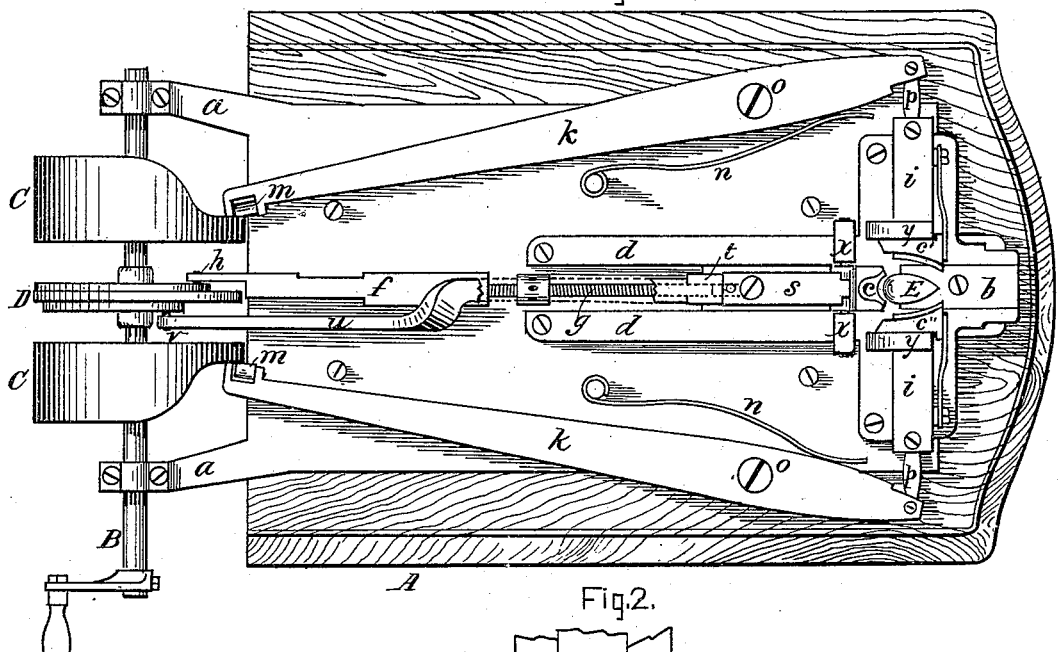
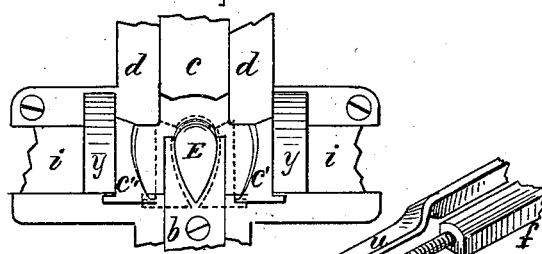
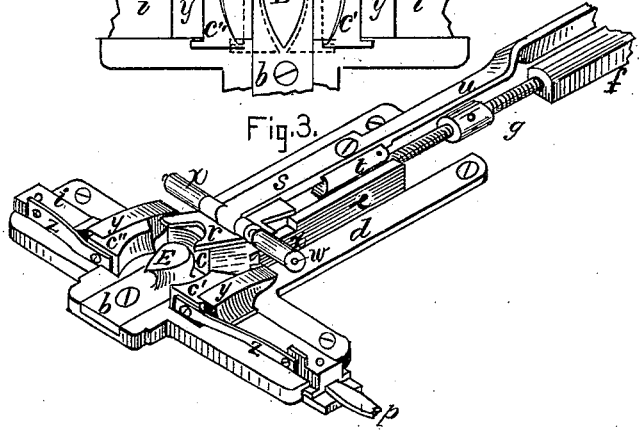
Witnesses:
James H. Williams
Chas. F. Munroe
Inventor:
Louis Coté
per Stephen Moore
attorney

UNITED STATES PATENT OFFICE.

LOUIS COTÉ, OF ST. HYACINTHE, QUEBEC, CANADA.

MACHINE FOR SHAPING HEEL-STIFFENERS FOR BOOTS AND SHOES.

SPECIFICATION forming part of Letters Patent No. 240,971, dated May 3, 1881.

Application filed February 28, 1881. (No model.)

*To all whom it may concern:*

Be it known that I, LOUIS COTÉ, of St. Hyacinthe, in the Province of Quebec and Dominion of Canada, have invented a new and useful Improvement in Machines for Shaping Heel-Stiffenings for Boots and Shoes, of which the following is a specification.

My invention relates to that class of shaping-machines in which a stiffening to be shaped is held closely about a heel-shaped former or male mold, with the edge of the stiffening which is to form the flange thereof projecting beyond the "sole" or "tread" side of such former, and which is provided with means for bending such projecting edge down upon the former, so as to form a flange nearly at a right angle to the body or main part of the stiffening.

The objects of my invention are to so arrange the clamping-jaws that operate to hold the stiffening close around the former that they shall be contiguous to each other when so operating; and, further, to provide means for guiding the slide, which operates to turn the flange of the stiffening in its passage over the same, in a curved path corresponding to the curve of that surface of the former upon which the flange is turned; and, further, to provide such an arrangement of operative mechanism that the several parts thereof shall be easily accessible for adjustment and repairs. To attain these objects I use the machine illustrated in the accompanying drawings, in which—

Figure 1 is a plan, with the arm *u* broken away to show the screw beneath. Fig. 2 is a plan of the former and clamping-jaws enlarged, with the crimping-slide removed; and Fig. 3, an isometrical view of the principal working parts.

Similar letters refer to similar parts in each of the drawings.

A, Fig. 1, represents a base-plate, to which the principal parts of the machine are attached. From its rear end project the arms *a a*, which support journals which carry the shaft B, upon which are mounted the cam-wheels C C and D. Near the opposite end of the machine is placed a former or male mold, E, about which the stiffening to be formed is held by the clamping-jaws *c c' c''*, which form a three-part female mold. (See Figs. 2 and 3.) This former is a heel-shaped block of metal, fastened, with its sole or tread surface uppermost, to the slide *b*, which is fastened in a groove in the base-plate by a screw, as plainly shown in Fig. 3.

The rear section, *c*, of the female mold mentioned is fastened to a sliding bar, *e*, that is guided in its movement by the ways *d d*, and has an intermittent reciprocating motion through the bar *f* (to which it is connected by the right-and-left screw *g*) and the cam-wheel D, upon one side of which is a cam-groove, in which plays a stud, *h*, attached to the bar *f*. The side sections of the mold *c' c''* are carried by the slides *i i*, and have an intermittent reciprocating motion in a direction at right angles to that of the rear section, *c*. This motion is communicated from the cam-wheels C C through the levers *k k*, which are pivoted at *o*, the ends of which carry small rolls *m m*, which rest against the sides of the cam-wheels C C, and are held thereto by the pressure of springs *n n* against the levers, near their opposite ends, to which the slides *i i* are attached by the connecting-bars *p p*. The cams which operate these three sections of the female mold are so shaped and adjusted that the rear section in the operation of the machine is first advanced, and afterward the side sections, so as to compress an interposed stiffening between themselves and the former. All three sections then remain stationary while the crimping-slide *r* is advanced over the top of the former and receded, when they simultaneously recede and become stationary in the position shown in the drawings.

The crimping-slide *r* is a thin plate of metal having its front end notched or curved inwardly, as shown, and pivoted to a flexible steel plate, *s*, which is attached to a bar, *t*, which is adapted to slide in a groove in the upper side of the bar *e*, and receives its motion from the connecting-rod *u*, which carries a stud, *v*, engaging with the cam-wheel D, as shown. The crimping-plate *r* is movable about the pin *w*, by which it is attached to the plate *s*, and the said pin projecting beyond the plate on either side carries rolls *x x*. As the plate *s*, with the crimping-plate *r*, is advanced, the rolls come in contact with the guide-blocks *y y*, which are curved upon their upper surfaces to conform longitudinally to the upper surface of the former E, and thus guide the crimping-plate at a uniform distance from the former, such distance being slightly less than the thickness of the flange of the interposed stiffening. This is one peculiar feature of my invention. Another is the arrangement of the side sections, $c'\,c''$, of the mold. These are connected to the guide-blocks $y\,y$ (which are firmly fastened to the slides $i\,i$) by a dovetailed projection and groove, so as to be movable horizontally therein, being kept in position by the springs $z\,z$. When the rear section, $c$, of the mold is advanced near to the former in the position shown by the dotted lines in Fig. 2, and the side sections are then moved toward the former, the beveled rear ends of the side sections strike upon the beveled corners of the rear section, and are thrown slightly forward, the springs $z\,z$ allowing such movement. This is an important feature of my invention, as with stiffenings of varying thickness it is difficult to have the three sections of the female mold, when rigidly attached to the several sliding bars which operate them, meet and form a perfectly-continuous surface around the sides and back of the former; but with this arrangement varying thicknesses of material may be used for the stiffenings, and yet the side sections, $c'\,c''$, will, in the operation of the machine, strike upon the rear section, $c$, and, being held thereto by the springs $z\,z$, form a continuous surface when closed about the former.

The rear section, $c$, may have a block of rubber placed between itself and the sliding bar $e$, to which it is attached, and the position of the same relative to the former may be adjusted by the screw $g$. The side levers, $k\,k$, which operate the sections $c'\,c''$, may be of steel and of such dimensions as to be elastic enough to allow for the varying thickness of material in the stiffenings; or other obvious means may be used to allow for the same.

I am aware that machines have been used having a former, a three-part mold, and a crimping-slide, and do not, broadly, claim such an arrangement; but What I do claim is—

1. In a machine for shaping heel-stiffenings, in combination with the former E, the three-part female mold $c\,c'\,c''$, the side sections, $c'\,c''$, of such mold being automatically adjustable toward or from the rear section, $c$, and operated by the slides $i\,i$, substantially as shown and described.

2. In combination, the former E, the three-part female mold $c\,c'\,c''$, the slides $i\,i$, and the springs $z\,z$, arranged and to operate substantially as set forth.

3. In combination, the male mold or former E, the three-part female mold $c\,c'\,c''$, the slides $i\,i$, connecting-bars $p\,p$, levers $k\,k$, and cam-wheels C C, substantially as herein set forth.

4. In combination with the former E and means for holding a stiffening firmly about it, the crimping-slide $r$, rolls $x\,x$, and guide-blocks $y\,y$, arranged to operate substantially as specified.

LOUIS COTÉ.

Witnesses:
J. HAULT,
A. M. MORIN.